United States Patent
Takashina

(10) Patent No.: US 9,850,587 B2
(45) Date of Patent: Dec. 26, 2017

(54) HARD COMPOSITE CHROMIUM PLATING FILM AND SLIDING MEMBER COATED WITH SUCH FILM

(71) Applicant: KABUSHIKI KAISHA RIKEN, Tokyo (JP)

(72) Inventor: Yousuke Takashina, Kashiwazaki (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 195 days.

(21) Appl. No.: 14/780,928

(22) PCT Filed: Mar. 26, 2014

(86) PCT No.: PCT/JP2014/058457
§ 371 (c)(1),
(2) Date: Sep. 28, 2015

(87) PCT Pub. No.: WO2014/157305
PCT Pub. Date: Oct. 2, 2014

(65) Prior Publication Data
US 2016/0053393 A1    Feb. 25, 2016

(30) Foreign Application Priority Data

Mar. 29, 2013  (JP) .................................. 2013-072560

(51) Int. Cl.
*F16C 33/04*    (2006.01)
*C10M 135/34*  (2006.01)
(Continued)

(52) U.S. Cl.
CPC ............. *C25D 3/06* (2013.01); *C10M 103/06* (2013.01); *C25D 7/10* (2013.01); *C25D 15/00* (2013.01);
(Continued)

(58) Field of Classification Search
CPC ........ C10M 2201/066; C10M 2219/10; C25D 11/04
(Continued)

(56) References Cited

U.S. PATENT DOCUMENTS

| | | |
|---|---|---|
| 3,876,389 A | 4/1975 | Chaudhari et al. |
| 5,868,917 A | 2/1999 | Benaben |
| 2012/0053093 A1* | 3/2012 | Sawyer ................ C10M 107/32 508/100 |

FOREIGN PATENT DOCUMENTS

| | | |
|---|---|---|
| EP | 2 660 362 A1 | 11/2013 |
| GB | 1380055 A | 1/1975 |

(Continued)

OTHER PUBLICATIONS

Extended European Search Report, issued in European Application No. 14773737.3, dated Nov. 8, 2016.
Snyder, "Performance Properties of Trivalent Chromium," XP055313028, Jan. 1993, pp. 445-450.
International Search Report issued in PCT/JP2014/058457, dated Jun. 17, 2014.
(Continued)

*Primary Examiner* — Vishal Vasisth
(74) *Attorney, Agent, or Firm* — Birch, Stewart, Kolasch & Birch, LLP

(57) ABSTRACT

To provide a trivalent chromium plating film, in which the generation of cracks penetrating from the film surface to a substrate interface is suppressed, and a sliding member coated with the trivalent chromium plating film, plating is conducted with a chromium plating bath containing trivalent chromium as a chromium source, with a second phase dispersed in a planar and/or fibrous form, such that the second phase in a planar and/or fibrous form is dispersed in the hard chromium plating film to prevent or deflect the propagation of cracks, and to suppress the increase of the crack width, thereby suppressing the propagation of cracks in the hard chromium plating film.

7 Claims, 1 Drawing Sheet

(51) Int. Cl.
- *C07D 339/04* (2006.01)
- *B41M 5/20* (2006.01)
- *C25D 7/00* (2006.01)
- *H01M 4/02* (2006.01)
- *C25D 3/06* (2006.01)
- *C25D 7/10* (2006.01)
- *C25D 15/00* (2006.01)
- *F16C 33/12* (2006.01)
- *C10M 103/06* (2006.01)

(52) U.S. Cl.
CPC .......... *F16C 33/121* (2013.01); *F16C 33/125* (2013.01); *F16C 2204/44* (2013.01)

(58) Field of Classification Search
USPC .................................. 508/108, 300; 205/50
See application file for complete search history.

(56) References Cited

FOREIGN PATENT DOCUMENTS

| | | |
|---|---|---|
| JP | 56-112493 A | 9/1981 |
| JP | 61-246400 A | 11/1986 |
| JP | 63-282295 A | 11/1988 |
| JP | 6-316789 A | 11/1994 |
| JP | 9-095793 A | 4/1997 |
| JP | 2002-030488 A | 1/2002 |
| JP | 2010-189673 A | 9/2010 |
| WO | WO 2012/091047 A1 | 7/2012 |
| WO | WO 2012/133613 A1 | 10/2012 |

OTHER PUBLICATIONS

Written Opinion issued in PCT/JP2014/058457, dated Jun. 17, 2014.

* cited by examiner

HARD COMPOSITE CHROMIUM PLATING FILM AND SLIDING MEMBER COATED WITH SUCH FILM

This application is a 371 of PCT/JP2014/058457, filed Mar. 26, 2014.

FIELD OF THE INVENTION

The present invention relates to a hard composite chromium plating film, particularly to a hard composite chromium plating film using trivalent chromium, and a sliding member such as a piston ring for internal engines, etc., which is coated with such a film.

BACKGROUND OF THE INVENTION

Piston rings for internal engines are required to have scuffing resistance and wear resistance when used with cylinder liners. To meet these requirements, the piston rings are plated with hard chromium, etc. on their outer peripheral sliding surfaces. However, because of the recent ban of using environmentally hazardous substance, hexavalent chromium used as a chromium source in chromium plating has become banned mostly in Europe.

Ni—W alloy plating films and thermally sprayed WC films have been developed as alternative films to the chromium plating film, but are not put into practical use because of disadvantages in performance and cost.

In the chromium plating film, research is under way to use less toxic trivalent chromium as a chromium source for a plating solution. Though trivalent chromium plating films as thin as 5 μm or less have been used so far for ornament and corrosion resistance, plating films as thick as 10 μm or more have not been industrially produced. As a result, research has been intensively conducted to provide thick plating films.

JP 56-112493 A teaches a chromium plating method using trivalent chromium and glycine as a chelating agent to produce a dense plating film as thick as several tens of micrometers.

JP 6-316789 A teaches a trivalent chromium bath containing wear-resistant, hard particles such as diamond particles, SiC particles, etc., and self-lubricating particles such as graphite, $MoS_2$, etc., to produce a film having improved wear resistance, which can be as thick as 9 μm, more than conventional thickness of about 2 μm.

JP 9-95793 A teaches an industrially usable trivalent chromium plating bath containing boric acid and glycine in combination with an ammonium salt, to produce plating films as thick as about 50 μm. It also teaches that a heat treatment at about 400° C. can increase the as-plated hardness of about HV 700 to about HV 1500.

Not only to make thicker, but also to improve the corrosion resistance of trivalent chromium plating films, JP 2010-189673 A teaches a trivalent chromium plating bath in the form of an aqueous solution containing a water-soluble trivalent chromium compound, a conductive salt, a pH buffer, a sulfur-containing compound and an aminocarboxylic acid.

To prevent the generation of toxic gases such as a halogen gas, etc. due to the decomposition of solution components, for improved long-term storability and operation environment, WO 2012/133613 teaches a trivalent chromium plating bath in the form of an aqueous solution containing a trivalent chromium compound, a pH buffer, an aminocarboxylic compound, a sulfamate compound, and an aminocarbonyl compound.

However, when hard chromium plating films as thick as 5 μm or more are formed using these trivalent chromium plating baths, as large cracks as extending from their film surfaces to near substrate interfaces are likely formed. Further, when heat-treated at about 200-400° C. to have hardness HV of about 1000-1500, their crack opening widths increase as shown in FIG. 2, resulting in the partial peeling of plating films. Thus, there actually remain many problems to be solved for practical use.

OBJECT OF THE INVENTION

In view of the above problems, an object of the present invention is to provide a trivalent chromium plating film having reduced crack width and propagation for suppressing the generation of cracks penetrating from a film surface to a substrate interface, and a sliding member coated with such a trivalent chromium plating film.

DISCLOSURE OF THE INVENTION

As a result of intensive research on the trivalent chromium plating, the inventor has found that plating using a chromium plating bath containing trivalent chromium as a chromium source, with a second phase in a planar and/or fibrous form dispersed therein, can provide a trivalent chromium plating film, in which the second phase is dispersed in a planar and/or fibrous form to stop or deflect the propagation of cracks and suppress the increase of the crack width, thereby suppressing the propagation of cracks in the hard chromium plating film.

Thus, the hard composite chromium plating film of the present invention, which is produced by using a chromium plating bath containing trivalent chromium as a chromium source, comprises a second phase in a planar and/or fibrous form dispersed in the film; the second phase being selected from the group consisting of oxides, carbides and nitrides of Si, Al, Ti and B, sulfides of Mo and W, graphite, mica, and resins; and an area ratio of the second phase being 3-60% in a cross section perpendicular to a surface of the film.

The second phase is preferably a planar and/or fibrous substance selected from the group consisting of $SiO_2$, SiC, $Si_3N_4$, $Al_2O_3$, $Al_2O_3$—$SiO_2$, AlN, TiC, and BN. The second phase is preferably planar $Al_2O_3$ having an average particle size of 5-50 μm and an aspect ratio of 5-100, or fibrous $Al_2O_3$ having an average diameter of 0.1-10 μm and an aspect ratio of 5-300. The second phase is preferably a single crystal.

In the hard composite chromium plating film, the maximum crack width in a cross section perpendicular to the film surface is preferably less than 5 μm.

The hard composite chromium plating film preferably has hardness HV0.05 of 600-1600.

The hard composite chromium plating film is preferably formed on a sliding member.

DESCRIPTION OF THE PREFERRED EMBODIMENTS

Figure 1:
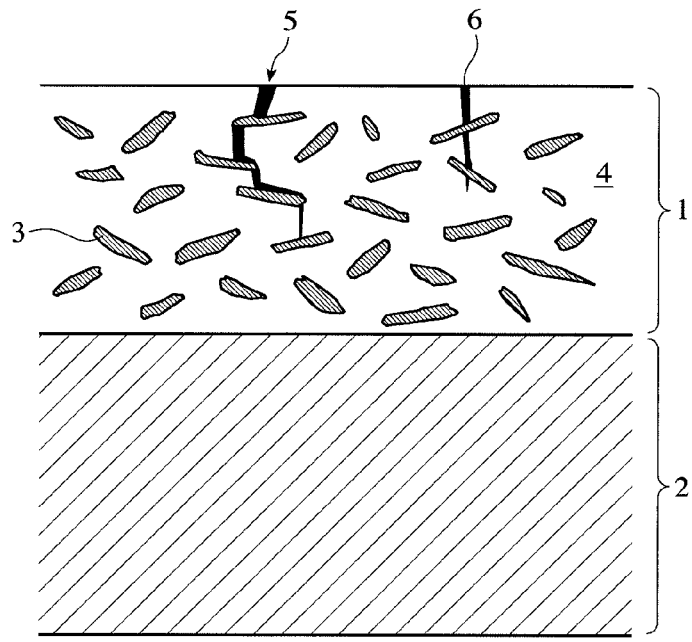
FIG. 1 is a view schematically showing a cross section of the hard composite chromium plating film of the present invention.
Figure 2:
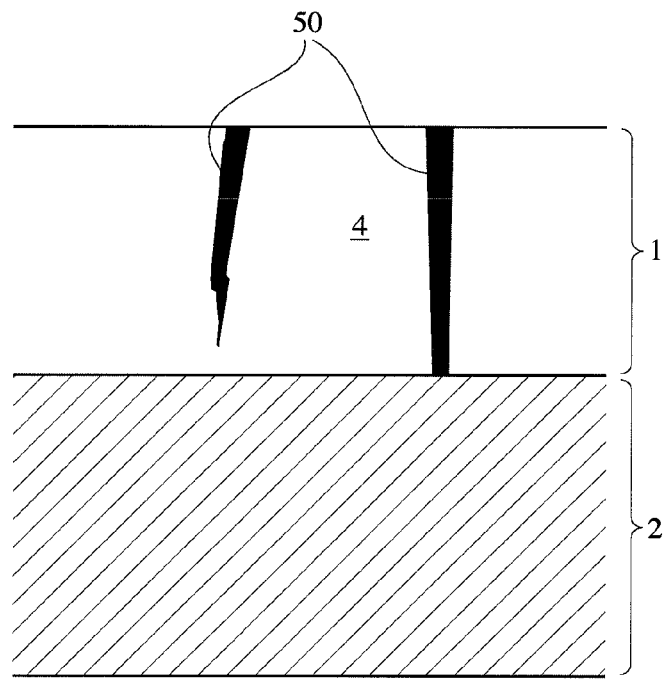
FIG. 2 is a view schematically showing a cross section of a conventional hard chromium plating film, which is produced with a chromium plating bath using trivalent chromium as a chromium source.

The hard composite chromium plating film of the present invention is formed by using a chromium plating bath containing trivalent chromium as a chromium source. It is known that the trivalent chromium plating bath comprises a trivalent chromium compound such as chromium sulfate or chloride as a main component, with various additives, such as a chelating agent combined with metal ions to form complex ions to suppress the formation of hydroxides, a pH buffer for buffering pH increase in a reaction interface, a conductive salt for increasing electric conductivity, etc. The chelating agents include aminocarboxylic acids such as glycine, alanine, aspartic acid, etc. The pH buffers include boric acid, sodium borate, phosphoric acid, sodium carbonate, etc. The conductive salts include potassium sulfate, sodium sulfate, potassium chloride, aluminum chloride, etc. In addition, sulfamates, aminocarbonyl compounds such as urea, etc. may be added for a catalytic function, etc. The trivalent chromium plating bath used in the present invention may contain the above known components, and the most usual bath composition comprises chromium chloride hexahydrate, glycine, boric acid, ammonium chloride, and aluminum chloride hexahydrate.

The hard composite chromium plating film of the present invention is characterized by a second phase in a planar and/or fibrous form dispersed in the film; the second phase being selected from the group consisting of oxides, carbides and nitrides of Si, Al, Ti and B, sulfides of Mo and W, graphite, mica, and resins; and an area ratio of the second phase being 3-60% in a cross section perpendicular to a surface of the film. The second phase dispersed in a planar and/or fibrous form preferably has less defects, and high modulus, strength and hardness, because it is introduced for composite strengthening and interactions with cracks generated in the film. From this aspect, the second phase is preferably a single crystal.

The second phase dispersed in a planar and/or fibrous form is selected from the group consisting of oxides, carbides and nitrides of Si, Al, Ti and B, sulfides of Mo and W, graphite, mica, and resins. Among them, it is preferably selected from the group consisting of $SiO_2$, $SiC$, $Si_3N_4$, $Al_2O_3$, $Al_2O_3$—$SiO_2$, AlN, TiC, and BN. For example, when $Al_2O_3$ is selected as the second phase, planar $\alpha$-$Al_2O_3$ produced by a hydrothermal synthesis method, which is in the form of planar particles with uniform particle sizes (diameters) and thickness, is preferably used. The planar $Al_2O_3$ has an average particle size of preferably 5-50 µm, more preferably 5-20 µm, and an aspect ratio of preferably 5-100, more preferably 5-50. Preferably used as fibrous $Al_2O_3$ is, for example, single crystal $Al_2O_3$ ($Al_2O_3$ whisker) having a C-axis in the fiber direction, which is produced by a vapor-liquid-solid (VSL) method. The fibrous $Al_2O_3$ has an average diameter of preferably 0.1-10 µm, more preferably 0.5-5 µm, and an aspect ratio of preferably 5-300, more preferably 5-100.

The amount of the second phase dispersed in a planar and/or fibrous form is 3-60%, as an area ratio A in a cross section perpendicular to the film surface. At the area ratio A of less than 3%, the effects of adding the second phase cannot be obtained. At the area ratio A of more than 60%, the second phase particles are undesirably in contact with each other, failing to provide a sufficiently dense composite film. The area ratio A is preferably 5-40%, more preferably 8-35%. Because the second phase in a planar and/or fibrous form is anisotropic, the second phase tends to be oriented in parallel with the plating film surface. Accordingly, the volume ratio of the second phase in the film is different from the area ratio of the second phase in a film cross section.

FIG. 1 shows a cross section of the hard composite chromium plating film of the present invention. In the hard composite chromium plating film 1 formed on a substrate 2, a planar and/or fibrous second phase 3 is dispersed in a chromium plating matrix 4. The second phase 3 having large anisotropy, namely a large aspect ratio, tends to be oriented in parallel with the film surface, acting to hinder the propagation of cracks perpendicular to the film surface. For example, in FIG. 1, the propagation of crack 5 is deflected by the second phase 3, with its energy absorbed, so that the propagation of cracks is suppressed. The propagation of crack 6 is also suppressed, with its opening hindered by a crack-bridging function. These interactions suppress the propagation of cracks, thereby preventing the generation of large cracks extending from the film surface to near a substrate interface. Oppositely, when the second phase 3 is oriented perpendicularly to the film surface, cracks propagate along interfaces of the second phase 3, so that they are likely to easily propagate from the film surface.

The maximum width of cracks is preferably limited to less than 5 µm. With crack widths limited to less than 5 µm, the partial peeling of the plating film can be avoided.

The hard composite chromium plating film of the present invention is extremely hardened by a heat treatment. As described above, the trivalent chromium plating bath contains various additives. For example, C and N contained in glycine ($H_2NCH_2COOH$), a chelating agent, exist as alloying carbon and nitrogen in the plating film. They presumably form fine chromium carbide and nitride or their precursors by a heat treatment, thereby hardening the plating film. Though variable depending on applications, the film hardness HV0.05 is preferably 600-1600, in the case of piston rings needing wear resistance. While conventional hexavalent hard chromium platings widely used for piston rings have hardness HV0.05 of about 800-1000, the hard composite chromium plating film of the present invention can have hardness HV0.05 of up to 1600. Accordingly, it may be said that it can be substituted for, for example, ion-plated nitride films such as CrN, etc. A hard composite chromium plating film as thick as about 5 µm to about 500 µm may be formed on piston rings such as top rings, second rings and oil rings for automobile engines and diesel engines of vessels. A piston ring substrate may be made of any known material.

The hard composite chromium plating film of the present invention is formed by adding the second phase in a planar and/or fibrous form to a chromium plating bath containing a trivalent chromium compound, a chelating agent, a buffer, a conductive salt, a catalyst, etc., and conducting plating at current density of 5-80 A/$dm^2$ and at a bath temperature of 30-60° C., with a graphite anode, and a substrate to be plated as an cathode. Though the planar second phase may be added as it is, long fibers in a cotton-like form, such as fibrous $Al_2O_3$ produced by a VSL method, are preferably pulverized to short fibers having proper aspect ratios, for example, by ball milling. To disperse the second phase in a planar and/or fibrous form in the plating film uniformly, for example, a low-frequency-vibration stirrer is preferably used. A low-power stirrer tends to have the second phase in a planar and/or fibrous form oriented in parallel with the film surface.

Example 1

Piston rings each having a nominal diameter d1 of 86 mm, a width h1 of 2.0 mm and a thickness a1 of 3.5 mm were fixed to a shaft to a height of about 320 mm, with upper and lower plates fastening them. 30 g/L of planar $Al_2O_3$ having an average particle size of 10 μm and an aspect ratio of 33 was added to a plating bath having a composition comprising 300 g/L of chromium chloride hexahydrate, 50 g/L of glycine, 30 g/L of boric acid, 130 g/L of ammonium chloride, and 50 g/L of aluminum chloride hexahydrate. The piston rings fixed to a shaft were washed, and immersed in the above plating bath. With the piston rings as a cathode, and a counter electrode as an anode, a hard composite chromium plating treatment was conducted at current density of 30 A/dm$^2$, and a plating bath temperature of 45° C. for 200 minutes, while stirring the plating bath. As a result, a thick, hard composite chromium plating film was formed on an outer peripheral surface of each piston ring.

[1] Measurement of Thickness t

A piston ring coated with a hard composite chromium plating film was cut in an axial direction perpendicular to the outer peripheral surface, at two positions of about 90° from its gap, and a position of about 180° from its gap (opposite side of the gap). The resultant cross sections at three positions were mirror-polished to measure their center thicknesses, which were averaged. As a result, the thickness of Example 1 was 95 μm.

[2] Measurement of Crack Width

The maximum crack width was measured on the three plating film cross sections used for the thickness measurement. The maximum crack width was 0.9 μm on average.

[3] Measurement of Area Ratio A of Second Phase ($Al_2O_3$)

A laser microscope photomicrograph (500 times) was taken on the three plating film cross sections used for the thickness measurement, and binarized to dark portions ($Al_2O_3$) and bright portions (chromium plating matrix). The area ratio of $Al_2O_3$ was determined to be 16% by image analysis.

[4] Measurement of Hardness HV0.05

The plating film cross sections used for the thickness measurement were measured with respect to hardness under a load of 50 g for 15 seconds, by a micro-Vickers hardness meter. The hardness was obtained by averaging the data at five positions. The hard composite chromium plating film of Example 1 had hardness HV0.05 of 780.

Example 2

A piston ring was provided with a hard composite chromium plating film in the same manner as in Example 1, and then subjected to a heat treatment at 250° C. for 1 hour in the air. With respect to the heat-treated piston ring, the thickness, maximum crack width and hardness of the hard composite chromium plating film, as well as the area ratio of $Al_2O_3$ in the film, were measured in the same manner as in Example 1. As a result, the thickness was 100 μm, the maximum crack width was 2.9 μm, the area ratio of $Al_2O_3$ was 17%, and the hardness HV0.05 was 1180.

Example 3

A thick, hard chromium plating film was formed on an outer peripheral surface of a piston ring in the same manner as in Example 1, except for using fibrous single crystal $Al_2O_3$ produced by a VSL method, in place of planar $Al_2O_3$. Because the fibrous single crystal $Al_2O_3$ was basically in a cotton-like form of long fibers, they were ball-milled with ethanol as a solvent for 24 hours. Observation by a scanning electron microscope revealed that the pulverized fibrous single crystal $Al_2O_3$ had an average diameter of 1.4 μm and an aspect ratio of 48. With respect to the plated piston ring, the thickness, maximum crack width and hardness of the hard composite chromium plating film, as well as the area ratio of single crystal $Al_2O_3$ in the film, were measured in the same manner as in Example 1. As a result, the thickness was 98 μm, the maximum crack width was 0.5 μm, the area ratio of single crystal $Al_2O_3$ was 13%, and the hardness HV0.05 was 830.

Example 4

A piston ring was provided with a hard composite chromium plating film in the same manner as in Example 3, and then subjected to a heat treatment at 250° C. for 1 hour in the air. With respect to the heat-treated piston ring, the thickness, maximum crack width and hardness of the hard composite chromium plating film, as well as the area ratio of fibrous single crystal $Al_2O_3$, were measured in the same manner as in Example 1. As a result, the thickness was 105 μm, the maximum crack width was 1.4 μm, the area ratio of single crystal $Al_2O_3$ was 13%, and the hardness HV0.05 was 1210.

Comparative Example 1

A thick, hard chromium plating film was formed on an outer peripheral surface of a piston ring in the same manner as in Example 1, except that planar $Al_2O_3$ was not added. With respect to the plated piston ring, the thickness, maximum crack width and hardness of the hard chromium plating film were measured in the same manner as in Example 1. The thickness was 128 μm, the maximum crack width was 5.8 μm, and the hardness HV 0.05 was 670.

Comparative Example 2

A piston ring was provided with a hard chromium plating film in the same manner as in Comparative Example 1, and then subjected to a heat treatment at 250° C. for 1 hour in the air. With respect to the heat-treated piston ring, the thickness, maximum crack width and hardness of the hard chromium plating film were measured in the same manner as in Example 1. The thickness was 131 μm, the maximum crack width was 9.9 μm, and the hardness HV0.05 was 1060. These results are shown in Table 1, together with those of Examples 1-4 and Comparative Example 1.

TABLE 1

| No. | Thickness t (μm) | Maximum Crack Width (μm) | Area Ratio A[(1)] (%) | Hardness (HV0.05) | Heat Treatment |
|---|---|---|---|---|---|
| Example 1 | 95 | 0.9 | 16 | 780 | No |
| Example 2 | 100 | 2.9 | 17 | 1180 | Yes |
| Example 3 | 98 | 0.5 | 13 | 830 | No |

TABLE 1-continued

| No. | Thickness t (μm) | Maximum Crack Width (μm) | Area Ratio A$^{(1)}$ (%) | Hardness (HV0.05) | Heat Treatment |
|---|---|---|---|---|---|
| Example 4 | 105 | 1.4 | 13 | 1210 | Yes |
| Com. Ex. 1 | 128 | 5.8 | — | 670 | No |
| Com. Ex. 2 | 131 | 9.9 | — | 1060 | Yes |

Note:
$^{(1)}$The area ratio A (%) of single crystal $Al_2O_3$.

Example 5

A thick, hard chromium plating film was formed on an outer peripheral surface of a piston ring in the same manner as in Example 1, except for changing the plating bath composition to 300 g/L of chromium chloride hexahydrate, 50 g/L of glycine, 40 g/L of boric acid, 100 g/L of ammonium sulfamate, 60 g/L of urea, and 25 g/L of aluminum chloride hexahydrate, and adding 50 g/L of planar $Al_2O_3$ having an average particle size of 10 μm and an aspect ratio of 33. With respect to the plated piston ring, the thickness, maximum crack width and hardness of the hard composite chromium plating film, as well as the area ratio of $Al_2O_3$ in the film, were measured in the same manner as in Example 1. As a result, the thickness was 95 μm, the maximum crack width was 0.8 μm, the area ratio of $Al_2O_3$ was 24%, and the hardness HV 0.05 was 890.

Example 6

A piston ring was provided with a hard composite chromium plating film in the same manner as in Example 5, and then subjected to a heat treatment at 400° C. for 1 hour in the air. With respect to the heat-treated piston ring, the thickness, maximum crack width and hardness of the hard composite chromium plating film, as well as the area ratio of $Al_2O_3$ in the film, were measured in the same manner as in Example 1. As a result, the thickness was 104 μm, the maximum crack width was 4.4 μm, the area ratio of $Al_2O_3$ was 23%, and the hardness HV0.05 was 1460.

Example 7

A thick, hard chromium plating film was formed on an outer peripheral surface of a piston ring in the same manner as in Example 5, except for using the pulverized fibrous single crystal $Al_2O_3$ in Example 3 in place of planar $Al_2O_3$. With respect to the plated piston ring, the thickness, maximum crack width and hardness of the hard composite chromium plating film, as well as the area ratio of $Al_2O_3$ in the film, were measured in the same manner as in Example 1. As a result, the thickness was 109 μm, the maximum crack width was 0.3 μm, the area ratio of single crystal $Al_2O_3$ was 21%, and the hardness HV0.05 was 920.

Example 8

A piston ring was provided with a hard composite chromium plating film in the same manner as in Example 7, and then subjected to a heat treatment at 400° C. for 1 hour in the air. With respect to the heat-treated piston ring, the thickness, maximum crack width and hardness of the hard composite chromium plating film, as well as the area ratio of $Al_2O_3$ in the film, were measured in the same manner as in Example 1. As a result, the thickness was 105 μm, the maximum crack width was 2.7 μm, the area ratio of $Al_2O_3$ was 21%, and the hardness HV0.05 was 1520. These results were shown in Table 2, together with those of Examples 5-7.

TABLE 2

| No. | Thickness t (μm) | Maximum Crack Width (μm) | Area Ratio A$^{(1)}$ (%) | Hardness (HV0.05) | Heat Treatment |
|---|---|---|---|---|---|
| Example 5 | 95 | 0.8 | 24 | 890 | No |
| Example 6 | 104 | 4.4 | 23 | 1460 | Yes |
| Example 7 | 109 | 0.3 | 21 | 920 | No |
| Example 8 | 105 | 2.7 | 21 | 1520 | Yes |

Note:
$^{(1)}$The area ratio A (%) of single crystal $Al_2O_3$.

EFFECT OF THE INVENTION

The hard composite chromium plating film of the present invention can be as thick as up to about 500 μm necessary for sliding members such as piston ring, etc., with the propagation of cracks generated by a hardness-improving heat treatment suppressed or deflected by the second phase dispersed in a planar and/or fibrous form in the film, the increase of the crack opening width suppressed by bridging, and further propagation of cracks suppressed. Because the hard composite chromium plating film of the present invention does not use toxic hexavalent chromium, a hard chromium plating step using hexavalent chromium can be avoided, resulting in decrease in environmentally hazardous substance. It is also practically advantageous in providing improved operation environment, easy drainage, etc.

What is claimed is:

1. A hard composite chromium plating film produced with a chromium plating bath using trivalent chromium as a chromium source, comprising a second phase dispersed in said film; said second phase being planar $Al_2O_3$ having an average diameter of 5-50 μm and an aspect ratio of 5-100 and/or fibrous $Al_2O_3$ having and an average diameter of 0.5-5 μm and an aspect ratio of 5-100; and an area ratio of said second phase being 3-60% in a cross section perpendicular to a surface of said film.

2. The hard composite chromium plating film according to claim 1, wherein said second phase consists of said planar $Al_2O_3$.

3. The hard composite chromium plating film according to claim 1, wherein said second phase consists of said fibrous $Al_2O_3$.

4. The hard composite chromium plating film according to claim 1, wherein said second phase is a single crystal.

5. The hard composite chromium plating film according to claim 1, wherein the maximum crack width observed in a cross section perpendicular to a surface of said film is less than 5 μm.

6. The hard composite chromium plating film according to claim 1, having hardness HV0.05 of 600-1600.

7. A sliding member coated with the hard composite chromium plating film recited in any one of claims 1, 2, 3, 4, 5, and 6.

* * * * *